US012668654B2

(12) United States Patent
Tanaka et al.

(10) Patent No.: US 12,668,654 B2
(45) Date of Patent: Jun. 30, 2026

(54) ELECTRET MATERIAL AND INDUCTION CONVERSION ELEMENT

(71) Applicant: DAIKIN INDUSTRIES, LTD., Osaka (JP)

(72) Inventors: Yoshito Tanaka, Osaka (JP); Makoto Matsuura, Osaka (JP); Yuuki Suzuki, Osaka (JP); Akitoshi Ogata, Osaka (JP); Satoru Yoneda, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 963 days.

(21) Appl. No.: 17/858,450

(22) Filed: Jul. 6, 2022

(65) Prior Publication Data

US 2022/0332865 A1 Oct. 20, 2022

Related U.S. Application Data

(63) Continuation of application No. PCT/JP2021/000259, filed on Jan. 6, 2021.

(30) Foreign Application Priority Data

Jan. 8, 2020 (JP) ................................ 2020-001649

(51) Int. Cl.

*C08F 214/18* (2006.01)
*C09D 5/24* (2006.01)
*C09D 7/20* (2018.01)
*C09D 127/12* (2006.01)

(52) U.S. Cl.

CPC ........... *C08F 214/182* (2013.01); *C09D 5/24* (2013.01); *C09D 7/20* (2018.01); *C09D 127/12* (2013.01)

(58) Field of Classification Search

CPC .................................................. C08F 214/182
See application file for complete search history.

(56) References Cited

U.S. PATENT DOCUMENTS 3,308,107 A 3/1967 Selman et al.
3,450,716 A 6/1969 Selman et al.
4,429,143 A 1/1984 Anderson et al.
6,201,085 B1 3/2001 Matsukura et al.
6,284,379 B1 9/2001 Matsukura et al.
6,491,979 B1 12/2002 Yamaguchi et al.
2006/0189788 A1 8/2006 Araki et al.
2006/0194936 A1 8/2006 Eriguchi et al.
2008/0015298 A1 1/2008 Xiong et al.
2008/0293863 A1 11/2008 Otozawa et al.
2010/0048956 A1 2/2010 Isaka et al.
2010/0080903 A1 4/2010 Tamitsuji et al.
2010/0134879 A1 6/2010 Yoshihara et al.
2011/0105686 A1* 5/2011 Kashiwagi ............ H04R 31/00
528/402
2012/0156504 A1 6/2012 Takebe et al.
2012/0208038 A1 8/2012 Kondo et al.
2013/0199828 A1 8/2013 Nakabayashi et al.
2014/0323661 A1 10/2014 Avataneo et al.
2015/0243856 A1 8/2015 Yamada et al.
2015/0299506 A1 10/2015 Fan et al.
2017/0009000 A1 1/2017 Hendershot et al.
2017/0114242 A1 4/2017 Lloyd et al.
2017/0114253 A1 4/2017 Nakayama et al.
2019/0194475 A1 6/2019 Takeuchi et al.
2019/0312202 A1 10/2019 Yokoyama et al.
2022/0259453 A1 8/2022 Morita et al.
2022/0267536 A1* 8/2022 Suzuki ................ C09D 129/14

FOREIGN PATENT DOCUMENTS

CN 106687863 5/2017
CN 108909091 11/2018
EP 1 724 291 11/2006
EP 2 821 846 1/2015
EP 4 053 173 9/2022

(Continued)

OTHER PUBLICATIONS

Mike, F.; Yang, Y.; Teraoka, I.; Ishigure, T.; Koike, Y.; Okamoto, Y. Macromolecules 2005, 38, 4237-4245. (Year: 2005).*
JP-2020128520-A (Aug. 27, 2020); machine translation. (Year: 2020).*
International Search Report issued Mar. 30, 2021 in International (PCT) Application No. PCT/JP2021/000252.
International Preliminary Report on Patentability and Written Opinion of the Searching Authority issued Jul. 12, 2022 in International (PCT) Application No. PCT/JP2021/000252.
International Search Report issued Apr. 6, 2021 in International (PCT) Application No. PCT/JP2021/000253.

(Continued)

*Primary Examiner* — Rip A Lee
(74) *Attorney, Agent, or Firm* — Wenderoth, Lind & Ponack, L.L.P.

(57) ABSTRACT

An object of the present disclosure is to provide, for example, a fluoropolymer electret material with hardness. The present disclosure relates to an electret material comprising a fluoropolymer, wherein the fluoropolymer comprises, as a main component, a monomer unit represented by formula (1):

(1)

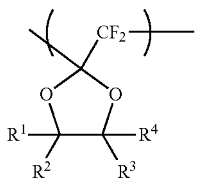

wherein $R^1$ to $R^4$ are each independently a fluorine atom, a fluoroalkyl group, or a fluoroalkoxy group; and the fluoropolymer has a mass average molecular weight of 1 million or more and 5 million or less, or 5000 or more and less than 20000.

16 Claims, 1 Drawing Sheet

(56) References Cited

FOREIGN PATENT DOCUMENTS

| | | | | |
|---|---|---|---|---|
| EP | 4 056 369 | | 9/2022 | |
| JP | 43-29154 | | 12/1968 | |
| JP | 58-69877 | | 4/1983 | |
| JP | 5-339255 | | 12/1993 | |
| JP | 2002-38075 | | 2/2002 | |
| JP | 2004-59763 | | 2/2004 | |
| JP | 2005-319661 | | 11/2005 | |
| JP | 2006-180450 | | 7/2006 | |
| JP | 2006-290779 | | 10/2006 | |
| JP | 2007-71839 | | 3/2007 | |
| JP | 2007-517083 | | 6/2007 | |
| JP | 2007-312551 | | 11/2007 | |
| JP | 2008-40262 | | 2/2008 | |
| JP | 2009-126879 | | 6/2009 | |
| JP | 2010-131569 | | 6/2010 | |
| JP | 2021-24901 | | 2/2012 | |
| JP | 2012-46674 | | 3/2012 | |
| JP | 2012-158726 | | 8/2012 | |
| JP | 2012-214752 | | 11/2012 | |
| JP | 2012-214753 | | 11/2012 | |
| JP | 2014-067609 | | 4/2014 | |
| JP | 2015-133505 | | 7/2015 | |
| JP | 2020-122068 | | 8/2020 | |
| JP | 2020128520 | A * | 8/2020 | ............ C08F 116/38 |
| TW | 406091 | | 9/2000 | |
| WO | 89/12071 | | 12/1989 | |
| WO | 2000/004109 | | 1/2000 | |
| WO | 2002/004534 | | 1/2002 | |
| WO | 2005/042511 | | 5/2005 | |
| WO | 2005/054313 | | 6/2005 | |
| WO | 2005/095471 | | 10/2005 | |
| WO | 2007/077722 | | 7/2007 | |
| WO | 2008/069301 | | 6/2008 | |
| WO | 2008/133088 | | 11/2008 | |
| WO | 2008/136346 | | 11/2008 | |
| WO | 2009/104699 | | 8/2009 | |
| WO | 2010/055758 | | 5/2012 | |
| WO | 2012/161162 | | 11/2012 | |
| WO | 2014/065001 | | 5/2014 | |
| WO | 2016/010043 | | 1/2016 | |
| WO | 2018/066527 | | 4/2018 | |
| WO | 2019/131290 | | 7/2019 | |

OTHER PUBLICATIONS

International Preliminary Report on Patentability and Written Opinion of the Searching Authority issued Jul. 12, 2022 in International (PCT) Application No. PCT/JP2021/000253.

International Search Report issued Mar. 9, 2021 in International (PCT) Application No. PCT/JP2021/000254.

International Preliminary Report on Patentability and Written Opinion of the Searching Authority issued Jul. 12, 2022 in International (PCT) Application No. PCT/JP2021/000254.

International Search Report issued Feb. 22, 2021 in International (PCT) Application No. PCT/JP2021/000255.

International Preliminary Report on Patentability and Written Opinion of the Searching Authority issued Jul. 12, 2022 in International (PCT) Application No. PCT/JP2021/000255.

International Search Report issued Apr. 6, 2021 in International (PCT) Application No. PCT/JP2021/000256.

International Preliminary Report on Patentability and Written Opinion of the Searching Authority issued Jul. 12, 2022 in International (PCT) Application No. PCT/JP2021/000256.

International Search Report issued Mar. 23, 2021 in International (PCT) Application No. PCT/JP2021/000259.

International Preliminary Report on Patentability and Written Opinion of the Searching Authority issued Jul. 12, 2022 in International (PCT) Application No. PCT/JP2021/000259.

Yoshitaka Saito & Akira Tsukamoto "Recent Applications of Fluororesins", Polymers, vol. 41, 1992, pp. 770-773, with English translation.

Extended European Search Report issued Dec. 15, 2023 in European Application No. 21738168.0.

Fang et al. "Mechanical and optical properties of the copolymers of perfluoro(2-methylene-4-methyl-1,3-dioxolane) and chlorotrifluoroethylene", Journal of Fluorine Chemistry, 2018, vol. 214, pp. 63-67.

Extended European Search Report issued Dec. 22, 2023 in European Application No. 21737961.9.

Extended European Search Report issued Dec. 22, 2023 in European Application No. 21738833.9.

Mikeš, F. et al., "Synthesis and Characterization of an Amorphous Perfluoropolymer: Poly(perfluoro-2-methylene-4-methyl-1,3-dioxolane)", Macromolecules, 2005, 38, pp. 4237-4245.

Koike, Kotaro, et al., "Synthesis and characterization of copolymers of perfluoro(2-methylene-4,5-dimethyl-1,3-dioxolane) and perfluoro(2-methylene-1,3-dioxolane)," Journal of Fluorine Chemistry, vol. 156, Oct. 18, 2013, pp. 198-202.

Yang, Yu, et al., "Novel Amorphous Perfluorocopolymeric System: Copolymers of Perfluoro-2-methylene-1,3-dioxolane Derivatives," Journal of Polymer Science: Part A: Polymer Chemistry, vol. 44, Jan. 26, 2006, pp. 1613-1618.

Okamoto, Y., et al., "The effect of fluorine substituents on the polymerization mechanism of 2-methylene-1,3-dioxolane and properties of the polymer products," Journal of Fluorine Chemistry, vol. 128, Dec. 15, 2006, pp. 202-206.

Chiang, Hao-Chun, et al., "Mechanical, optical and gas transport properties of poly(perfluoro-2-methylene-4-methyl-1,3- dioxolane) membrane containing perfluoropolyether as a plasticizer," Journal of Fluorine Chemistry, vol. 236, May 22, 2020 (4 pages).

Extended European Search Report issued Jan. 19, 2024 in European patent application No. 21738337.1.

Extended European Search Report issued Jan. 26, 2024 in European patent application No. 21738041.9.

Extended European Search Report issued Jan. 26, 2024 in European patent application No. 21738566.5.

* cited by examiner

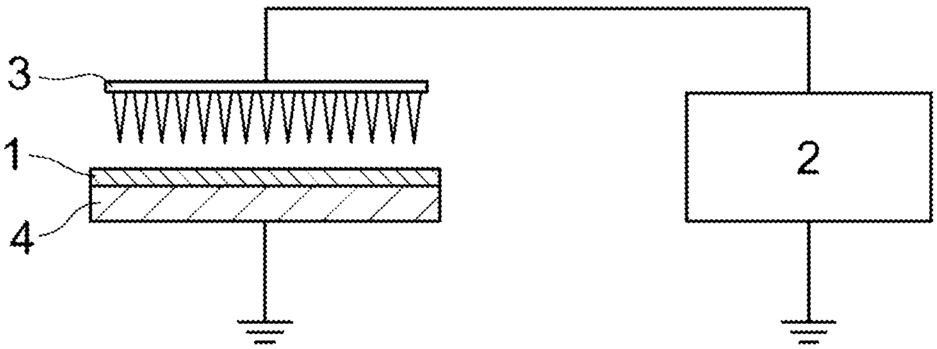
3
1
4
2

ELECTRET MATERIAL AND INDUCTION CONVERSION ELEMENT

TECHNICAL FIELD

The present disclosure relates to, for example, an electret material, an electrostatic induction conversion element comprising the same, and a coating agent for forming an electret material.

BACKGROUND ART

The use of fluoropolymers as electret materials for electrostatic induction elements is being considered (PTL 1 to PTL 3). Electret materials are required to play the role of storing (charging) electric potential. Since the amount of charge generally increases with the increase in the thickness of electret materials, there has been a demand for thicker films (PTL 2). In addition, electret materials are further required to prevent the occurrence of peeling from base materials and their own fracture caused by, for example, vibration for power generation and stress in harsh environments due to outdoor use.

CITATION LIST

Patent Literature

PTL 1: WO2009/104699
PTL 2: JP2006-180450A
PTL 3: JP2007-312551A

SUMMARY

The present disclosure includes, for example, the following embodiment.

An electret material comprising a fluoropolymer, wherein the fluoropolymer comprises, as a main component, a monomer unit represented by formula (1):

(1)

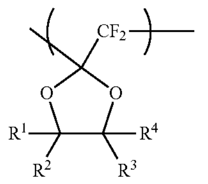

wherein $R^1$ to $R^4$ are each independently a fluorine atom, a fluoroalkyl group, or a fluoroalkoxy group; and the fluoropolymer has a mass average molecular weight of 1 million or more and 5 million or less, or 5000 or more and less than 20000.

Advantageous Effects

It was found that when a fluoropolymer comprising the monomer unit represented by formula (1) as a main component is used as an electret material, the molecular weight thereof is set to 1 million or more and 5 million or less, or 5000 or more and less than 20000, whereby peeling from the base material is prevented, and thick film formation is possible.

The present disclosure is capable of providing a fluoropolymer electret material that is prevented from being peeled off from a base material. The present disclosure is capable of providing a highly rigid fluoropolymer electret material by using the fluoropolymer having a mass average molecular weight of 1 million or more and 5 million or less. The present disclosure is capable of providing a fluoropolymer electret material having a large end content by using the fluoropolymer having a mass average molecular weight of 5000 or more and less than 20000. The present disclosure is capable of providing a fluoropolymer electret material having a large initial surface potential. The present disclosure is capable of providing a fluoropolymer electret material having excellent potential retention. The present disclosure is capable of providing a fluoropolymer electret material with a large thickness. The present disclosure is capable of providing a coating agent for forming an electret material in which a fluoropolymer is dissolved at a high concentration, and that is advantageous for the production of thick films.

BRIEF DESCRIPTION OF DRAWING

FIG. 1 is a schematic diagram of a device used in corona discharge treatment for electret formation in the Examples and Comparative Example.

DESCRIPTION OF EMBODIMENTS

The above overview of the present disclosure is not intended to describe each of the disclosed embodiments or all of the implementations of the present disclosure.

The following description of the present disclosure illustrates embodiments of examples in more detail.

In several parts of the present disclosure, guidance is provided through examples, and these examples can be used in various combinations.

In each case, the group of examples can function as a non-exclusive and representative group.

All publications, patents, and patent applications cited herein are incorporated herein by reference in their entirety.

Terms

Unless otherwise specified, the symbols and abbreviations in the present specification can be understood in the sense commonly used in the technical field to which the present disclosure pertains, according to the context of the present specification.

In the present specification, the terms "comprise" and "contain" are used with the intention of including the terms "consisting essentially of" and "consisting of."

Unless otherwise specified, the steps, treatments, or operations described in the present specification can be performed at room temperature. In the present specification, room temperature can mean a temperature within the range of 10° C. or higher and 40° C. or lower.

In the present specification, the phrase "$C_n$-$C_m$" (n and m are each a number) indicates that the number of carbon atoms is n or more and m or less, as would be commonly understood by a person skilled in the art.

In the present specification, the expression "thickness" or simply "film thickness" with respect to a film means an average film thickness. The average film thickness is determined as follows.

Average Film Thickness

The average film thickness is the average value of a thickness measured 5 times with a micrometer. When measuring the thickness of a film itself is difficult, such as when a film formed on a base material of a substrate etc. cannot be peeled off, the average film thickness is calculated by measuring the thickness of the base material before film formation and the thickness of the base material after film formation 5 times each with a micrometer, and subtracting the average value of the thickness before film formation from the average value of the thickness after film formation.

When the measurement cannot be performed with a micrometer, the film thickness obtained by measuring the line profile of the cut surface of a film to be measured with an atomic force microscope (AFM) is defined as the average film thickness.

Specifically, the average film thickness is a value determined by the method described in a specific example of the present disclosure.

In the present specification, the simple expression "molecular weight" means mass average molecular weight. The mass average molecular weight is determined as follows.

Mass Average Molecular Weight

The mass average molecular weight is measured by using the following GPC analysis method. Specifically, the mass average molecular weight is a value determined by the method described in a specific example of the present disclosure.

GPC Analysis Method

Sample Preparation Method

A polymer is dissolved in perfluorobenzene to prepare a 2 mass % polymer solution, and the polymer solution is passed through a membrane filter (0.22 μm) to obtain a sample solution.

Measurement Method

Standard sample for measurement of molecular weight: polymethyl methacrylate

Detection method: RI (differential refractometer)

In the present specification, the "indentation hardness" and "indentation elastic modulus" are determined as follows.

Indentation Hardness and Indentation Elastic Modulus

The indentation hardness ($H_{IT}$; indentation hardness) of a sample is measured using an ENT-2100 ultra-fine hardness tester produced by Nanotec Corporation. The indentation elastic modulus is also measured at the same time. The test is performed by adjusting the indentation depth to be 1/10 or less of the thickness. Specifically, the indentation hardness and indentation elastic modulus are values determined by the method described in a specific example of the present disclosure.

In the present specification, the "surface potential" is determined as follows.

Surface Potential

A fluoropolymer formed into an electret is measured with a surface electrometer (Model 347, produced by Trek Japan). Specifically, the surface potential is a value determined by the method described in a specific example of the present disclosure.

In the present specification, the "end content" is determined as follows.

End Content

The end content is determined as a relative value of the number of carbonate end groups per $1\times10^6$ carbon atoms in the monomer unit forming the fluoropolymer backbone. Specifically, this is expressed as a value relative to the number of carbonate end groups in the fluoropolymer of Reference Preparation Example 1, described later, which is taken as 100. The number of carbonate end groups is determined as follows.

A film with a thickness of 0.05 mm or more and 0.2 mm or less is formed from a cut piece of a cast film or press-molded film of the fluoropolymer. The absorbance of the peak at 1809 $cm^{-1}$ attributed to the carbonyl group of the carbonate group (—OC(═O)O—) is measured by infrared absorption spectrum analysis of the film. The number (N) of carbonate groups per $10^6$ backbone carbon atoms is calculated according to the following equation.

$$N=500AW/\varepsilon df$$

A: Absorbance of the peak at 1809 $cm^{-1}$ derived from the carbonate group (—OC(═O)O—)

ε: Molar absorbance coefficient of the peak at 1809 $cm^{-1}$ derived from the carbonate group (—OC(═O)O—) ($1\cdot cm^{-1}\cdot mol^{-1}$). From the model compound, ε=170.

W: Composition average monomer molecular weight calculated from monomer composition d: Film density ($g/cm^3$)

f: Film thickness (mm)

The infrared absorption spectrum analysis is performed using a Perkin-Elmer 1760x FTIR spectrometer (produced by Perkin-Elmer) with 40 scans. The baseline of the IR spectrum obtained is automatically determined by using Perkin-Elmer Spectrum for Windows, Ver. 1.4C, and the absorbance A of the peak at 1809 $cm^{-1}$ is measured. Further, the thickness of the film is measured with a micrometer.

Specifically, the end content is a value determined by the method described in a specific example of the present disclosure.

In the present specification, the "glass transition temperature" is determined as follows.

Glass Transition Temperature (Tg)

The temperature is increased (first run), decreased, and then increased (second run) at 10° C./minute in the temperature range of 30° C. or higher and 200° C. or lower using a DSC (differential scanning calorimeter; Hitachi High-Tech Science Corporation, DSC7000); the midpoint of the endothermic curve in the second run is determined to be the glass transition temperature (° C.).

In the present specification, unless otherwise specified, examples of "alkyl" include linear or branched $C_1$-$C_{10}$ alkyl, such as methyl, ethyl, propyl, isopropyl, butyl, isobutyl, sec-butyl, tert-butyl, pentyl, isopentyl, neopentyl, hexyl, heptyl, octyl, nonyl, and decyl.

In the present specification, unless otherwise specified, "fluoroalkyl" is alkyl in which at least one hydrogen atom is replaced with a fluorine atom. "Fluoroalkyl" can be linear or branched fluoroalkyl.

The number of carbon atoms in "fluoroalkyl" can be, for example, 1 to 12, 1 to 6, 1 to 5, 1 to 4, 1 to 3, 6, 5, 4, 3, 2, or 1.

The number of fluorine atoms in "fluoroalkyl" can be 1 or more (e.g., 1 to 3, 1 to 5, 1 to 9, 1 to 11, or 1 to the maximum substitutable number).

"Fluoroalkyl" includes perfluoroalkyl.

"Perfluoroalkyl" is alkyl in which all hydrogen atoms are replaced with fluorine atoms.

Examples of perfluoroalkyl include trifluoromethyl ($CF_3$—), pentafluoroethyl ($C_2F_5$—), heptafluoropropyl ($CF_3CF_2CF_2$—) and heptafluoroisopropyl ($(CF_3)_2CF$—).

Specific examples of "fluoroalkyl" include monofluoromethyl, difluoromethyl, trifluoromethyl ($CF_3$—), 2,2,2-trifluoroethyl ($CF_3CH_2$—), perfluoroethyl ($C_2F_5$—), tetrafluoropropyl (e.g., $HCF_2CF_2CH_2$—), hexafluoropropyl (e.g., $(CF_3)_2CH$—), perfluorobutyl (e.g., $CF_3CF_2CF_2CF_2$—), octafluoropentyl (e.g., $HCF_2CF_2CF_2CF_2CH_2$—), perfluoropentyl (e.g., $CF_3CF_2CF_2CF_2CF_2$—) perfluorohexyl (e.g., $CF_3CF_2CF_2CF_2CF_2CF_2$—), and the like.

In the present specification, unless otherwise specified, "alkoxy" can be a group represented by RO—, wherein R is alkyl (e.g., $C_1$-$C_{10}$ alkyl).

Examples of "alkoxy" include linear or branched $C_1$-$C_{10}$ alkoxy, such as methoxy, ethoxy, propoxy, isopropoxy, butoxy, isobutoxy, sec-butoxy, tert-butoxy, pentyloxy, isopentyloxy, neopentyloxy, hexyloxy, heptyloxy, octyloxy, nonyloxy, and decyloxy.

In the present specification, unless otherwise specified, "fluoroalkoxy" is alkoxy in which at least one hydrogen atom is replaced with a fluorine atom. "Fluoroalkoxy" can be linear or branched fluoroalkoxy.

The number of carbon atoms in "fluoroalkoxy" can be, for example, 1 to 12, 1 to 6, 1 to 5, 1 to 4, 1 to 3, 6, 5, 4, 3, 2, or 1.

The number of fluorine atoms in "fluoroalkoxy" can be 1 or more (e.g., 1 to 3, 1 to 5, 1 to 9, 1 to 11, or 1 to the maximum substitutable number).

"Fluoroalkoxy" includes perfluoroalkoxy.

"Perfluoroalkoxy" is alkoxy in which all hydrogen atoms are replaced with fluorine atoms.

Examples of "perfluoroalkoxy" include trifluoromethoxy ($CF_3O$—), pentafluoroethoxy ($C_2F_5O$—), heptafluoropropoxy ($CF_3CF_2CF_2O$—), and heptafluoroisopropoxy ($(CF_3)_2CFO$—).

Specific examples of "fluoroalkoxy" include monofluoromethoxy, difluoromethoxy, trifluoromethoxy, 2,2,2-trifluoroethoxy ($CF_3CH_2O$—), perfluoroethoxy ($C_2F_5O$—), tetrafluoropropyloxy (e.g. $HCF_2CF_2CH_2O$—), hexafluoropropyloxy (e.g., $(CF_3)_2CHO$—), perfluorobutyloxy (e.g., $CF_3CF_2CF_2CF_2O$—), octafluoropentyloxy (e.g., $HCF_2CF_2CF_2CF_2CH_2O$—), perfluoropentyloxy (e.g., $CF_3CF_2CF_2CF_2CF_2O$—), perfluorohexyloxy (e.g., $CF_3CF_2CF_2CF_2CF_2CF_2O$—), and the like.

Electret Material

The electret material comprises:

- a fluoropolymer comprising, as a main component, a monomer unit represented by formula (1):

(1)

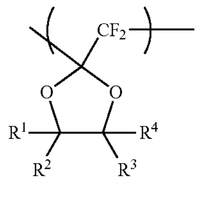

wherein $R^1$ to $R^4$ are each independently a fluorine atom, a fluoroalkyl group, or a fluoroalkoxy group (which may be referred to as "unit (1)" in the present specification); and having a mass average molecular weight of 1 million or more and 5 million or less (which may be referred to as "high-molecular-weight fluoropolymer" in the present specification); or

- a fluoropolymer comprising unit (1) as a main component and having a mass average molecular weight of 5000 or more and less than 20000 (which may be referred to as "low-molecular-weight fluoropolymer" in the present specification).

In the present specification, phrases such as "comprising a monomer unit as a main component" mean that the percentage of the specific monomer unit is 50 mol % or more based on the total monomer units in a polymer.

Unit (1) as a monomer unit constituting the fluoropolymer may be used singly or in a combination of two or more.

The percentage of unit (1) may be, for example, 70 mol % or more, preferably 80 mol % or more, more preferably 90 mol % or more, and particularly preferably 100 mol %, based on the total monomer units of the fluoropolymer.

Fluoropolymer Comprising Unit (1) as Main Component

Fluoropolymers comprising unit (1) as a main component are roughly divided into a high-molecular-weight fluoropolymer, a low-molecular-weight fluoropolymer, and a medium-molecular-weight fluoropolymer (a polymer having a mass average molecular weight of 20000 or more and less than 1 million). The electret material of the present disclosure comprises a high-molecular-weight fluoropolymer or a low-molecular-weight fluoropolymer.

High-Molecular-Weight Fluoropolymer

The electret material comprising a high-molecular-weight fluoropolymer has high hardness and rigidity.

The electret material comprising a high-molecular-weight fluoropolymer is prevented from being peeled off from the base material.

The electret material comprising a high-molecular-weight fluoropolymer has a large initial surface potential.

The electret material comprising a high-molecular-weight fluoropolymer has excellent potential retention.

General high-molecular-weight fluoropolymers had low solubility in solvents, it was difficult to obtain high-concentration liquids, and even if they were dissolved, the viscosity tended to increase. It was thus considered difficult to use them for film formation by coating. However, by polymerizing a monomer corresponding to unit (1) in an aprotic solvent (solution polymerization) to produce a fluoropolymer comprising unit (1) as a main component, it was possible to obtain a polymerization reaction mixture in which a high-molecular-weight fluoropolymer was dissolved at a high concentration and whose viscosity was not high. In the present disclosure, the use of this polymerization reaction mixture as a coating agent facilitated the formation of high-molecular-weight fluoropolymer films and reduced peeling of the films from base materials. Therefore, an electret material comprising a high-molecular-weight fluoropolymer could be provided.

The mass average molecular weight of the high-molecular-weight fluoropolymer can be, for example, 1 million or more and 5 million or less, or more than 1 million and 5 million or less, preferably 1.1 million or more and 3 million or less, more preferably 1.1 million or more and 2 million or less. When the molecular weight is 1 million or more, the rigidity of the electret material increases. When the molecular weight is 5 million or less, it is easy to set the polymerization conditions during polymer production, and it is easy to mold the polymer.

Low-Molecular-Weight Fluoropolymer

The electret material comprising a low-molecular-weight fluoropolymer is prevented from being peeled off from the base material.

The electret material comprising a low-molecular-weight fluoropolymer has a large initial surface potential.

The electret material comprising a low-molecular-weight fluoropolymer has excellent potential retention.

The electret material comprising a low-molecular-weight fluoropolymer has a high end content.

Fluoropolymer Comprising Unit (1) as Main Component

General low-molecular-weight fluoropolymers are known to have low polymer strength. Therefore, it was difficult to use low-molecular-weight fluoropolymers as electret materials exposed to vibration etc. because there was concern about the occurrence of peeling from base materials and the fracture of the polymers. However, it was found that low-molecular-weight fluoropolymers had better adhesion to base materials than that of medium-molecular-weight fluoropolymers, and could withstand use as electret materials (e.g., outdoor use). It is considered that due to the low molecular weight, the amount of polymer ends (number of ends) per unit mass of the fluoropolymer increases, which enhances the adhesion to the base material. In PTL 1, the adhesion to base materials is ensured by introducing a carboxylic acid group at the end of a fluoropolymer comprising unit (1) as a main component. In contrast, fluoropolymer films formed using a coating agent containing a polymerization reaction mixture obtained by solution polymerization are prevented from being peeled off from base materials, even without introducing a carboxylic acid group at the fluoropolymer end.

The end content can be, for example, 110 or more, 120 or more, 130 or more, 140 or more, 150 or more, 200 or more, 110 or more and 1000 or less, 120 or more and 1000 or less, 130 or more and 1000 or less, 140 or more and 1000 or less, 150 or more and 1000 or less, 200 or more and 1000 or less, 110 or more and 600 or less, 120 or more and 600 or less, 130 or more and 600 or less, 140 or more and 600 or less, 150 or more and 600 or less, or 200 or more and 600 or less.

The mass average molecular weight of the low-molecular-weight fluoropolymer can be, for example, 5000 or more and less than 20000, preferably 8000 or more and less than 20000, and more preferably 10000 or more and less than 20000. When the molecular weight is 5000 or more, the heat resistance is enhanced. When the molecular weight is less than 20000, the end content increases, and the adhesion is enhanced.

In each of $R^1$ to $R^4$, fluoroalkyl can be, for example, linear or branched $C_1$-$C_5$ fluoroalkyl, linear or branched $C_1$-$C_4$ fluoroalkyl, linear or branched $C_1$-$C_3$ fluoroalkyl, or $C_1$-$C_2$ fluoroalkyl.

The linear or branched $C_1$-$C_5$ fluoroalkyl is preferably linear or branched $C_1$-$C_5$ perfluoroalkyl.

The linear or branched $C_1$-$C_4$ fluoroalkyl is preferably linear or branched $C_1$-$C_4$ perfluoroalkyl.

The linear or branched $C_1$-$C_3$ fluoroalkyl is preferably linear or branched $C_1$-$C_3$ perfluoroalkyl.

The $C_1$-$C_2$ fluoroalkyl group is preferably $C_1$-$C_2$ perfluoroalkyl.

In each of $R^1$ to $R^4$, fluoroalkoxy can be, for example, linear or branched $C_1$-$C_5$ fluoroalkoxy, linear or branched $C_1$-$C_4$ fluoroalkoxy, linear or branched $C_1$-$C_3$ fluoroalkoxy, or $C_1$-$C_2$ fluoroalkoxy.

The linear or branched $C_1$-$C_5$ fluoroalkoxy is preferably linear or branched $C_1$-$C_5$ perfluoroalkoxy.

The linear or branched $C_1$-$C_4$ fluoroalkoxy is preferably linear or branched $C_1$-$C_4$ perfluoroalkoxy.

The linear or branched $C_1$-$C_3$ fluoroalkoxy is preferably linear or branched $C_1$-$C_3$ perfluoroalkoxy.

The $C_1$-$C_2$ fluoroalkoxy is preferably $C_1$-$C_2$ perfluoroalkoxy.

$R^1$ to $R^4$ can be each independently fluorine, linear or branched $C_1$-$C_5$ fluoroalkyl, or linear or branched $C_1$-$C_5$ fluoroalkoxy.

$R^1$ to $R^4$ can be each independently fluorine, linear or branched $C_1$-$C_5$ perfluoroalkyl, or linear or branched $C_1$-$C_5$ perfluoroalkoxy.

$R^1$ to $R^4$ can be each independently fluorine, linear or branched $C_1$-$C_4$ fluoroalkyl, or linear or branched $C_1$-$C_4$ fluoroalkoxy.

$R^1$ to $R^4$ can be each independently fluorine, linear or branched $C_1$-$C_4$ perfluoroalkyl, or linear or branched $C_1$-$C_4$ perfluoroalkoxy.

$R^1$ to $R^4$ can be each independently fluorine, linear or branched $C_1$-$C_3$ fluoroalkyl, or linear or branched $C_1$-$C_3$ fluoroalkoxy.

$R^1$ to $R^4$ can be each independently fluorine, linear or branched $C_1$-$C_3$ perfluoroalkyl, or linear or branched $C_1$-$C_3$ perfluoroalkoxy.

$R^1$ to $R^4$ can be each independently fluorine, $C_1$-$C_2$ fluoroalkyl, or $C_1$-$C_2$ fluoroalkoxy.

$R^1$ to $R^4$ can be each independently fluorine, $C_1$-$C_2$ perfluoroalkyl, or $C_1$-$C_2$ perfluoroalkoxy.

$R^1$ to $R^4$ can be each independently fluorine, trifluoromethyl, pentafluoroethyl, or trifluoromethoxy.

At least one of $R^1$ to $R^4$ can be fluorine, and the other groups in $R^1$ to $R^4$ can be independently $C_1$-$C_2$ perfluoroalkyl or $C_1$-$C_2$ perfluoroalkoxy when two or more such other groups are present.

At least two of $R^1$ to $R^4$ can be fluorine, and the other groups in $R^1$ to $R^4$ can be independently $C_1$-$C_2$ perfluoroalkyl or $C_1$-$C_2$ perfluoroalkoxy when two or more such other groups are present.

At least three of $R^1$ to $R^4$ can be fluorine, and the other group in $R^1$ to $R^4$ can be $C_1$-$C_2$ perfluoroalkyl or $C_1$-$C_2$ perfluoroalkoxy.

At least three of $R^1$ to $R^4$ can be fluorine atoms, and the other group in $R^1$ to $R^4$ can be $C_1$-$C_2$ perfluoroalkyl.

$R^1$ to $R^4$ can be all fluorine atoms.

Unit (1) can be a monomer unit represented by the following formula (1-1) (this unit may be referred to as "unit (1-1)" in the present specification).

(1-1)

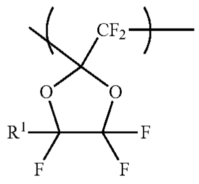

In the formula, $R^1$ is a fluorine atom, a fluoroalkyl group, or a fluoroalkoxy group.

Unit (1-1) as a monomer unit constituting the fluoropolymer may be used singly or in a combination of two or more.

In unit (1-1), $R^1$ can be fluorine, linear or branched $C_1$-$C_5$ fluoroalkyl, or linear or branched $C_1$-$C_5$ fluoroalkoxy.

In unit (1-1), $R^1$ can be fluorine, linear or branched $C_1$-$C_5$ perfluoroalkyl, or linear or branched $C_1$-$C_5$ perfluoroalkoxy.

In unit (1-1), $R^1$ can be fluorine, linear or branched $C_1$-$C_4$ fluoroalkyl, or linear or branched $C_1$-$C_4$ fluoroalkoxy.

In unit (1-1), $R^1$ can be fluorine, linear or branched $C_1$-$C_4$ perfluoroalkyl, or linear or branched $C_1$-$C_4$ perfluoroalkoxy.

In unit (1-1), $R^1$ can be fluorine, linear or branched $C_1$-$C_3$ fluoroalkyl, or linear or branched $C_1$-$C_3$ fluoroalkoxy.

In unit (1-1), $R^1$ can be fluorine, linear or branched $C_1$-$C_3$ perfluoroalkyl, or linear or branched $C_1$-$C_3$ perfluoroalkoxy.

In unit (1-1), $R^1$ can be fluorine, $C_1$-$C_2$ fluoroalkyl, or $C_1$-$C_2$ fluoroalkoxy.

In unit (1-1), $R^1$ can be fluorine, $C_1$-$C_2$ perfluoroalkyl, or $C_1$-$C_2$ perfluoroalkoxy.

In unit (1-1), $R^1$ can be fluorine, trifluoromethyl, pentafluoroethyl, or trifluoromethoxy.

In unit (1-1), $R^1$ can be $C_1$-$C_2$ perfluoroalkyl or $C_1$-$C_2$ perfluoroalkoxy.

In unit (1-1), $R^1$ can be $C_1$-$C_2$ perfluoroalkyl.

Preferred examples of unit (1-1) include a monomer unit represented by the following formula (1-11) (this monomer unit may be referred to as "unit (1-11)" in the present specification).

(1-11)

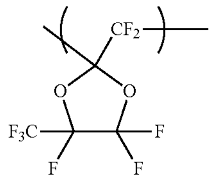

The fluoropolymer may comprise a fluoroolefin unit in addition to unit (1).

The fluoroolefin unit may be used singly or in a combination of two or more.

The percentage of the fluoroolefin unit can be 50 mol % or less, preferably 30 mol % or less, more preferably 20 mol % or less, even more preferably 10 mol % or less, and particularly preferably 0 mol %, based on the total monomer units.

The fluoroolefin unit is a monomer unit that is formed after polymerization of a monomer containing fluorine and a carbon-carbon double bond.

The atoms constituting the fluoroolefin unit may be only fluorine, halogen other than fluorine, carbon, hydrogen, and oxygen.

The atoms constituting the fluoroolefin unit may be only fluorine, halogen other than fluorine, carbon, and hydrogen.

The atoms constituting the fluoroolefin unit may be only fluorine, carbon, and hydrogen.

The atoms constituting the fluoroolefin unit may be only fluorine and carbon.

The fluoroolefin unit includes at least one unit selected from the group consisting of a fluorine-containing perhaloolefin unit, a vinylidene fluoride unit ($-CH_2-CF_2-$), a trifluoroethylene unit ($-CFH-CF_2-$), a pentafluoropropylene unit ($-CFH-CF(CF_3)-$, $-CF_2-CF(CHF_2)-$), a 1,1,1,2-tetrafluoro-2-propylene unit ($-CH_2-CF(CF_3)-$), and the like.

The fluorine-containing perhaloolefin unit is a monomer unit that is formed after polymerization of a monomer containing fluorine and a carbon-carbon double bond, and optionally halogen other than fluorine.

The fluorine-containing perhaloolefin unit includes at least one member selected from the group consisting of a chlorotrifluoroethylene unit ($-CFCl-CF_2-$), a tetrafluoroethylene unit ($-CF_2-CF_2-$), a hexafluoropropylene unit ($-CF_2-CF(CF_3)-$), a perfluoro(methyl vinyl ether) unit ($-CF_2-CF(OCF_3)-$), a perfluoro(ethyl vinyl ether) unit ($-CF_2-CF(OC_2F_5)-$), perfluoro(propyl vinyl ether) unit ($-CF_2-CF(OCF_2C_2F_5)-$), perfluoro(butyl vinyl ether) unit ($-CF_2-CF(O(CF_2)_2C_2F_5)-$), and a perfluoro (2,2-dimethyl-1,3-dioxol) unit ($-CF-CAF-$ (wherein A represents a perfluorodioxolane ring formed with the adjacent carbon atom shown in the formula, with two trifluoromethyl bonded to the carbon atom at position 2 of the dioxolane ring).

The fluoroolefin unit includes at least one member selected from the group consisting of a chlorotrifluoroethylene unit, a tetrafluoroethylene unit, a hexafluoropropylene unit, a perfluoro(methyl vinyl ether) unit, and a perfluoro (propyl vinyl ether) unit.

The fluoropolymer may further contain one or more other monomer units in addition to unit (1) and the fluoroolefin unit. However, it is preferable to contain no other monomer units.

The other monomer units include $CH_2=CHRf$ (wherein Rf represents a $C_1$-$C_{10}$ fluoroalkyl group) units, alkyl vinyl ether units (e.g., a cyclohexyl vinyl ether unit, ethyl vinyl ether unit, butyl vinyl ether unit, and methyl vinyl ether unit), alkenyl vinyl ether units (e.g., a polyoxyethylene allyl ether unit and ethyl allyl ether unit), organosilicon compound units having a reactive α,β-unsaturated group (e.g., a vinyltrimethoxysilane unit, vinyltriethoxysilane unit, and a vinyltris(methoxyethoxy)silane unit), acrylic ester units (e.g., a methyl acrylate unit and ethyl acrylate unit), methacrylic ester units (e.g., a methyl methacrylate unit and ethyl methacrylate unit), vinyl ester units (e.g., a vinyl acetate unit, vinyl benzoate unit, and a VeoVA (vinyl ester produced by Shell plc) unit), and the like.

The percentage of the other monomer units may be, for example, 0 mol % or more and 20 mol % or less, or 0 mol % or more and 10 mol % or less, based on the total monomer units.

The fluoropolymer preferably has a glass transition temperature (Tg) of 110° C. or higher, more preferably 110° C. or higher and 300° C. or lower, even more preferably 120° C. or higher and 300° C. or lower, and particularly preferably 125° C. or higher and 200° C. or lower. A glass transition temperature within these ranges is advantageous in terms of high bending durability of the electret material.

A fluoropolymer can be produced, for example, by polymerizing one or more monomers corresponding to one or more monomer units constituting the fluoropolymer by an appropriate polymerization method. For example, a fluoropolymer can be produced by polymerizing one or more monomers corresponding to unit (1).

A fluoropolymer can also be produced by polymerizing one or more monomers corresponding to unit (1), optionally with at least one monomer selected from the group consisting of fluoroolefins and other monomers.

A person skilled in the art would be able to understand monomers corresponding to the monomer units constituting a fluoropolymer. For example, a monomer corresponding to unit (1) is a compound represented by formula (M1):

(M1)

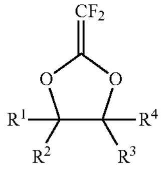

wherein $R^1$ to $R^4$ are as defined above (this compound may be referred to as "monomer (M1)" in the present specification).

For example, a monomer corresponding to unit (1-1) is a compound represented by formula (M1-1):

(M1-1)

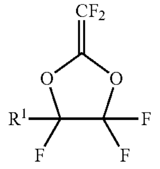

wherein $R^1$ is a fluorine atom, a fluoroalkyl group, or a fluoroalkoxy group (this compound may be referred to as "monomer (M1-1)" in the present specification).

For example, the monomer corresponding to unit (1-11) is a compound represented by formula (M1-11):

(M1-11)

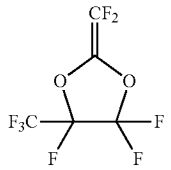

(this compound may be referred to as "monomer (M1-11)" in the present specification).

The fluoroolefins for use may be monomers corresponding to the fluoroolefin units mentioned above. For example, the monomers corresponding to the tetrafluoroethylene unit, hexafluoropropylene unit, and vinylidene fluoride unit are tetrafluoroethylene ($CF_2{=}CF_2$), hexafluoropropylene ($CF_3CF{=}CF_2$), and vinylidene fluoride ($CH_2{=}CF_2$), respectively. Thus, the details regarding fluoroolefins would be able to be understood by a person skilled in the art from the description of the corresponding fluoroolefin units.

For example, the fluoroolefin may be at least one member selected from the group consisting of fluorine-containing perhaloolefins, vinylidene fluoride, trifluoroethylene, pentafluoropropylene, and 1,1,1,2-tetrafluoro-2-propylene. Preferably, the fluoroolefin may be at least one member selected from the group consisting of chlorotrifluoroethylene, tetrafluoroethylene, hexafluoropropylene, perfluoro(methyl vinyl ether), and perfluoro(propyl vinyl ether).

The fluorine-containing perhaloolefin may be at least one member selected from the group consisting of chlorotrifluoroethylene, tetrafluoroethylene, hexafluoropropylene, perfluoro(methyl vinyl ether), perfluoro(ethyl vinyl ether), perfluoro(propyl vinyl ether), perfluoro(butyl vinyl ether), and perfluoro(2,2-dimethyl-1,3-dioxol).

The other monomers for use may be monomers corresponding to the other monomer units mentioned above. Thus, the details regarding the other monomers would be able to be understood by a person skilled in the art from the description of the corresponding other monomer units.

The polymerization method includes, for example, a method of using appropriate amounts of monomers corresponding to the monomer units that constitute the fluoropolymer, with the monomers being optionally dissolved or dispersed in a solvent (e.g., an aprotic solvent) and a polymerization initiator being optionally added, and performing polymerization (e.g., radical polymerization, bulk polymerization, solution polymerization, suspension polymerization, dispersion polymerization, or emulsion polymerization).

The polymerization method is preferably solution polymerization because solution polymerization can produce a high-concentration solution of the fluoropolymer and thereby achieve a high manufacturing yield, and is advantageous for the formation of a thick film and purification. The polymerization method is also preferably bulk polymerization that tends to increase the molecular weight. The fluoropolymer is preferably produced by solution polymerization. The fluoropolymer is more preferably produced by solution polymerization in which one or more monomers are polymerized in the presence of an aprotic solvent.

The solvent for use in solution polymerization of the fluoropolymer is preferably an aprotic solvent. The amount of aprotic solvent for use in the production of the fluoropolymer is, for example, 80 mass % or less, less than 80 mass %, 75 mass % or less, 70 mass % or less, 35 mass % or more and 95 mass % or less, 35 mass % or more and 90 mass % or less, 35 mass % or more and 80 mass % or less, 35 mass % or more and 70 mass % or less, 35 mass % or more and less than 70 mass %, or 60 mass % or more and 80 mass % or less, based on the sum of the mass of the monomers and the mass of the solvent. The amount can be preferably 35 mass % or more and less than 80 mass %, more preferably 40 mass % or more and 75 mass % or less, and particularly preferably 50 mass % or more and 70 mass % or less.

The aprotic solvent for use in the polymerization of fluoropolymers can be, for example, at least one member selected from the group consisting of perfluoroaromatic compounds, perfluorotrialkylamines, perfluoroalkanes, hydrofluorocarbons, perfluorocyclic ethers, hydrofluoroethers, and olefin compounds containing at least one chlorine atom.

The perfluoroaromatic compound is, for example, a perfluoroaromatic compound optionally having one or more perfluoroalkyl groups. The aromatic ring of the perfluoroaromatic compound can be at least one ring selected from the group consisting of a benzene ring, a naphthalene ring, and an anthracene ring. The perfluoroaromatic compound can have one or more (e.g., one, two, or three) aromatic rings.

The perfluoroalkyl group as a substituent is, for example, linear or branched, $C_1$-$C_6$, $C_1$-$C_5$, or $C_1$-$C_4$ perfluoroalkyl, and preferably linear or branched $C_1$-$C_3$ perfluoroalkyl.

The number of substituents is, for example, one to four, preferably one to three, and more preferably one or two. When a plurality of substituents are present, the substituents may be the same or different.

Examples of perfluoroaromatic compounds include perfluorobenzene, perfluorotoluene, perfluoroxylene, and perfluoronaphthalene.

Preferred examples of perfluoroaromatic compounds include perfluorobenzene and perfluorotoluene.

The perfluorotrialkylamine is, for example, an amine substituted with three linear or branched perfluoroalkyl groups. The number of carbon atoms of each perfluoroalkyl group is, for example, 1 to 10, preferably 1 to 5, and more preferably 1 to 4. The perfluoroalkyl groups can be the same or different, and are preferably the same.

Examples of perfluorotrialkylamines include perfluorotrimethylamine, perfluorotriethylamine, perfluorotripropylamine, perfluorotriisopropylamine, perfluorotributylamine, perfluorotri-sec-butylamine, perfluorotri-tert-butylamine, perfluorotripentylamine, perfluorotriisopentylamine, and perfluorotrineopentylamine.

Preferred examples of perfluorotrialkylamines include perfluorotripropylamine and perfluorotributylamine.

The perfluoroalkane is, for example, a linear, branched, or cyclic $C_3$-$C_{12}$ (preferably $C_3$-$C_{10}$, more preferably $C_3$-$C_6$) perfluoroalkane.

Examples of perfluoroalkanes include perfluoropentane, perfluoro-2-methylpentane, perfluorohexane, perfluoro-2-methylhexane, perfluoroheptane, perfluorooctane, perfluorononane, perfluorodecane, perfluorocyclohexane, perfluoro (methylcyclohexane), perfluoro(dimethylcyclohexane) (e.g., perfluoro(1,3-dimethylcyclohexane)), and perfluorodecalin.

Preferred examples of perfluoroalkanes include perfluoropentane, perfluorohexane, perfluoroheptane, and perfluorooctane.

The hydrofluorocarbon is, for example, a $C_3$-$C_8$ hydrofluorocarbon. Examples of hydrofluorocarbons include $CF_3CH_2CF_2H$, $CF_3CH_2CF_2CH_3$, $CF_3CHFCHFC_2F_5$, 1,1,2,2,3,3,4-heptafluorocyclopentane, $CF_3CF_2CF_2CF_2CH_2CH_3$, $CF_3CF_2CF_2CF_2CF_2CHF_2$, and $CF_3CF_2CF_2CF_2CF_2CF_2CH_2CH_3$.

Preferred examples of hydrofluorocarbons include $CF_3CH_2CF_2H$ and $CF_3CH_2CF_2CH_3$.

The perfluorocyclic ether is, for example, a perfluorocyclic ether optionally having one or more perfluoroalkyl groups. The ring of the perfluorocyclic ether may be a 3- to 6-membered ring. The ring of the perfluorocyclic ether may have one or more oxygen atoms as a ring-constituting atom. The ring preferably has one or two oxygen atoms, and more preferably one oxygen atom.

The perfluoroalkyl group as a substituent is, for example, linear or branched $C_1$-$C_6$, $C_1$-$C_5$, or $C_1$-$C_4$ perfluoroalkyl. The perfluoroalkyl group is preferably linear or branched $C_1$-$C_3$ perfluoroalkyl.

The number of substituents is, for example, one to four, preferably one to three, and more preferably one or two. When a plurality of substituents are present, they may be the same or different.

Examples of perfluorocyclic ethers include perfluorotetrahydrofuran, perfluoro-5-methyltetrahydrofuran, perfluoro-5-ethyltetrahydrofuran, perfluoro-5-propyltetrahydrofuran, perfluoro-5-butyltetrahydrofuran, and perfluorotetrahydropyran.

Preferred examples of perfluorocyclic ethers include perfluoro-5-ethyltetrahydrofuran and perfluoro-5-butyltetrahydrofuran.

The hydrofluoroether is, for example, a fluorine-containing ether.

The hydrofluoroether preferably has a global warming potential (GWP) of 400 or less, and more preferably 300 or less.

Examples of hydrofluoroethers include $CF_3CF_2CF_2CF_2OCH_3$, $CF_3CF_2CF(CF_3)OCH_3$, $CF_3CF(CF_3)CF_2OCH_3$, $CF_3CF_2CF_2CF_2OC_2H_5$, $CF_3CH_2OCF_2CHF_2$, $C_3F_5CF(OCH_3)C_3F_7$, $(CF_3)_2CHOCH_3$, $(CF_3)_2CFOCH_3$, $CHF_2CF_2OCH_2CF_3$, $CHF_2CF_2CH_2OCF_2CHF_2$, $CF_3CHFCF_2OCH_3$, $CF_3CHFCF_2OCF_3$, trifluoromethyl 1,2,2,2-tetrafluoroethyl ether (HFE-227me), difluoromethyl 1,1,2,2,2-pentafluoroethyl ether (HFE-227mc), trifluoromethyl 1,1,2,2-tetrafluoroethyl ether (HFE-227pc), difluoromethyl 2,2,2-trifluoroethyl ether (HFE-245mf), 2,2-difluoroethyltrifluoromethyl ether (HFE-245pf), 1,1,2,3,3,3-hexafluoropropylmethyl ether ($CF_3CHFCF_2$ $OCH_3$), 1,1,2,2-tetrafluoroethyl 2,2,2-trifluoroethyl ether ($CHF_2CF_2OCH_2CF_3$), and 1,1,1,3,3,3-hexafluoro-2-methoxypropane ($(CF_3)_2CHOCH_3$).

Preferred examples of hydrofluoroethers include $CF_3CF_2CF_2CF_2OCH_3$, $CF_3CF_2CF_2CF_2OC_2H_5$, $CF_3CH_2OCF_2CHF_2$, and $C_2F_5CF(OCH_3)C_3F_7$.

The hydrofluoroether is preferably a compound represented by the following formula (B1):

$$R^{21}—O—R^{22} \quad (B1)$$

wherein $R^{21}$ is linear or branched perfluorobutyl and $R^{22}$ is methyl or ethyl.

The olefin compound containing at least one chlorine atom is a $C_2$-$C_4$ (preferably $C_2$-$C_3$) olefin compound containing at least one chlorine atom in its structure. The olefin compound containing at least one chlorine atom is a compound in which at least one of the hydrogen atoms bonded to the carbon atoms in a $C_2$-$C_4$ hydrocarbon having one or two (preferably one) carbon-carbon double bonds (C═C) is replaced with chlorine. A compound in which at least one of the hydrogen atoms bonded to two carbon atoms constituting the carbon-carbon double bond in a $C_2$-$C_4$ hydrocarbon is replaced with chlorine is preferred.

The number of chlorine atoms is one to the maximum substitutable number. The number of chlorine atoms may be, for example, one, two, three, four, or five.

The olefin compound containing at least one chlorine atom may contain at least one (e.g., one, two, three, four, or five) fluorine atom.

Examples of olefin compounds containing at least one chlorine atom include $CH_2$═CHCl, CHCl═CHCl, $CCl_2$═CHCl, $CCl_2$═$CCl_2$, $CF_3CH$═CHCl, $CHF_2CF$═CHCl, $CFH_2CF$═CHCl, $CF_3CCl$═CFCl, $CF_2HCl$═CFCl, and $CFH_2Cl$═CFCl.

Preferred examples of olefin compounds containing at least one chlorine atom include CHCl═CHCl, $CHF_2CF$═CHCl, $CF_3CH\alpha CHCl$, and $CF_3CCl$═CFCl.

As the aprotic solvent, a hydrofluoroether is preferable because it has less environmental impact during use and polymers can be dissolved at high concentrations in it.

Preferred examples of polymerization initiators used in production of the fluoropolymer include di-n-propyl peroxydicarbonate, diisopropyl peroxydicarbonate, diisobutyryl peroxide, di(ω-hydro-dodecafluoroheptanoyl)peroxide, di(ω-hydro-hexadecafluorononanoyl)peroxide, ω-hydro-dodecafluoroheptanoyl-ω-hydro-hexadecafluorononanoyl-peroxide, benzoyl peroxide, tert-butyl peroxypivalate, tert-hexyl peroxypivalate, ammonium persulfate, sodium persulfate, and potassium persulfate.

Particularly preferred examples of polymerization initiators include di-n-propyl peroxydicarbonate, diisopropyl peroxydicarbonate, diisobutyryl peroxide, di(ω-hydro-dodecafluoroheptanoyl)peroxide, benzoyl peroxide, tert-butyl peroxypivalate, Cert-hexyl peroxypivalate, and ammonium persulfate.

The amount of the polymerization initiator for use in the polymerization reaction can be, for example, 0.0001 g or more and 0.05 g or less, preferably 0.0001 g or more and 0.01 g or less, and more preferably 0.0005 g or more and 0.008 g or less, per gram of all of the monomers subjected to the reaction.

The temperature of the polymerization reaction can be, for example, −10° C. or higher and 160° C. or lower, preferably 0° C. or higher and 160° C. or lower, and more preferably 0° C. or higher and 100° C. or lower.

The reaction time for the polymerization reaction is preferably 0.5 hours or more and 72 hours or less, more preferably 1 hour or more and 48 hours or less, and even more preferably 3 hours or more and 30 hours or less.

The polymerization reaction can be performed in the presence or absence of an inert gas (e.g., nitrogen gas), and preferably in the presence of an inert gas.

The polymerization reaction can be performed under reduced pressure, atmospheric pressure, or increased pressure.

The polymerization reaction can be performed by adding one or more monomers to an aprotic solvent containing a polymerization initiator and subjecting it to polymerization conditions. The polymerization reaction can also be performed by adding a polymerization initiator to an aprotic solvent containing one or more monomers and subjecting it to polymerization conditions.

The fluoropolymer produced by the polymerization reaction may be purified, if desired, by a conventional method, such as extraction, dissolution, concentration, filtration, precipitation, reprecipitation, dehydration, adsorption, or chromatography, or a combination of these methods. Alternatively, a solution of the fluoropolymer produced by the polymerization reaction, a dilute solution thereof, or a mixture of the solution with other optional components or the like may be dried or heated (e.g., 30° C. or higher and 150° C. or lower) to form an electret material containing the fluoropolymer.

The content of the fluoropolymer in the electret material can be, for example, 50 mass % or more and 100 mass % or less, preferably 60 mass % or more and 100 mass % or less, more preferably 80 mass % or more and 100 mass % or less, and particularly preferably 90 mass % or more and 100 mass % or less, based on the total mass of the electret material.

The electret material may comprise other components in addition to the fluoropolymer. Such other components may be components generally used in electret materials. Examples include wetting agents, levelling agents, colorants, light-diffusing agents, fillers, plasticizers, viscosity modifiers, flexibilizers, light-resistant stabilizers, reaction inhibitors, and adhesion promoters.

The electret material may comprise other components in appropriate amounts as long as the effects of the present disclosure are obtained. The content of the other components can be, for example, 0 mass % or more and 50 mass % or less, preferably 0 mass % or more and 40 mass % or less, more preferably 0 mass % or more and 20 mass % or less, and particularly preferably 0 mass % or more and 10 mass % or less, based on the total mass of the electret material.

The electret material can be produced, for example, by drying, heating, etc. a solution obtained by dissolving or dispersing the fluoropolymer in a solvent to thus remove the solvent from the solution. Preferably, the electret material can be produced by removing the solvent from the coating agent of the present disclosure described below.

The thickness of the electret material can be appropriately selected according to the functions etc. required for the film, and can be, for example, 10 nm or more, 10 nm or more and 1000 μm or less, 30 nm or more and 500 μm or less, 50 nm or more and 500 μm or less, or 0.1 μm or more. The thickness can be preferably 100 nm or more and 500 μm or less, more preferably 500 nm or more and 300 μm or less, even more preferably 800 nm or more and 200 μm or less, and particularly preferably 10 μm or more and 200 μm or less. When the average film thickness is within these ranges, it is advantageous in terms of preventing peeling from the base material.

The electret material has a high indentation hardness and indentation elastic modulus by comprising a fluoropolymer. Therefore, the electret material is advantageous as an electret material for electrostatic induction conversion elements that are used in harsh conditions such as outdoor environments.

The indentation hardness of the electret material can be, for example, 450 $N/mm^2$ or more and 1000 $N/mm^2$ or less, preferably 450 $N/mm^2$ or more and 800 $N/mm^2$ or less, and more preferably 450 $N/mm^2$ or more and 600 $N/mm^2$ or less.

The indentation elastic modulus of the electret material can be, for example, 3.5 GPa or more and 10 GPa or less, preferably 3.5 GPa or more and 8 GPa or less, and more preferably 4.0 GPa or more and 6 GPa or less.

Electrostatic Induction Conversion Element

One embodiment of the present disclosure is an electrostatic induction conversion element comprising the electret material. The type of electrostatic induction conversion element is not limited as long as the electret material can be applied. The electrostatic induction conversion element may be incorporated into instruments such as vibration generators, actuators, and sensors, and is useful in terms of durability etc. particularly when these instruments are used outdoor.

For the details of the electret material in the electrostatic induction conversion element, the description in the above explanation can be applied.

Coating Agent

One embodiment of the present disclosure is a coating agent for forming an electret material comprising a specific fluoropolymer.

The coating agent may comprise a fluoropolymer and an aprotic solvent.

The fluoropolymer in the coating agent may be the fluoropolymer described above for the electret material. Therefore, the details of the fluoropolymer for the electret material are applicable to the details of the fluoropolymer for the coating agent.

The content of the fluoropolymer in the coating agent can be, for example, 5 mass % or more and 65 mass % or less, 10 mass % or more and 65 mass % or less, 20 mass % or more and 65 mass % or less, 30 mass % or more and 65 mass % or less, more than 30 mass % and 65 mass % or less, or 20 mass % or more and 40 mass % or less, based on the total mass of the coating agent. The content is preferably more than 20 mass % and 65 mass % or less, more preferably 25 mass % or more and 60 mass % or less, and particularly preferably 30 mass % or more and 50 mass % or less.

The aprotic solvent in the coating agent may be the aprotic solvent described above for the electret material. Therefore, the details of the aprotic solvent for the electret material are applicable to the details of the aprotic solvent for the coating agent.

The content of the aprotic solvent in the coating agent can be, for example, 35 mass % or more and 95 mass % or less, 35 mass % or more and 90 mass % or less, 35 mass % or more and 80 mass % or less, 35 mass % or more and 70 mass % or less, 35 mass % or more and less than 70 mass %, or 60 mass % or more and 80 mass % or less, based on the total mass of the coating agent. The content is preferably 35 mass % or more and less than 80 mass %, more preferably 40 mass % or more and 75 mass % or less, and particularly preferably 50 mass % or more and 70 mass % or less.

The coating agent may comprise a polymerization initiator. The polymerization initiator for the coating agent may be the polymerization initiator described above for the electret material. Therefore, the details of the polymerization initiator for the electret material are applicable to the details of the polymerization initiator for the coating agent.

The content of the polymerization initiator in the coating agent is, for example, 0.00001 mass % or more and 10 mass % or less, preferably 0.00005 mass % or more and 10 mass % or less, and more preferably 0.0001 mass % or more and 10 mass % or less, based on the total mass of the coating agent.

The coating agent may comprise the fluoropolymer and an aprotic solvent, and optionally a polymerization initiator and optionally other components, in appropriate amounts. Examples of other components can include colorants, light-diffusing agents, fillers, plasticizers, viscosity modifiers, flexibilizers, light-resistant stabilizers, reaction inhibitors, and adhesion promoters. The content of the other components can be, for example, 0.01 mass % or more and 50 mass % or less, preferably 0.01 mass % or more and 30 mass % or less, more preferably 0.01 mass % or more and 20 mass % or less, based on the total mass of the coating agent.

The coating agent can be produced by mixing the fluoropolymer and an aprotic solvent, optionally with a polymerization initiator and optionally with other components.

The coating agent can be produced by mixing a polymerization reaction mixture obtained by the solution polymerization of fluoropolymer described above (this reaction mixture contains at least a fluoropolymer and an aprotic solvent) optionally with an aprotic solvent and/or other components.

When solution polymerization is performed, the fluoropolymer concentration or the amount of fluoropolymer dissolved in the polymerization reaction mixture can be increased, and the step of isolating the fluoropolymer from the polymerization reaction mixture can be omitted. For this reason, the coating agent preferably contains a polymerization reaction mixture obtained by solution polymerization.

In the coating agent, the content of the polymerization reaction mixture of solution polymerization can be appropriately selected according to the concentration of the fluoropolymer in the polymerization reaction mixture and the functions, thickness, etc. of the film to be produced. The content of the polymerization reaction mixture of solution polymerization in the coating agent can be, for example, 5 mass % or more and 100 mass % or less, preferably 20 mass % or more and 100 mass % or less, and more preferably 30 mass % or more and 100 mass % or less, based on the total mass of the coating agent.

The coating agent comprising an aprotic solvent in which the fluoropolymer is dissolved or dispersed can form a film, for example, by applying the agent to a portion in which the formation of protective film is required by an appropriate method (e.g., spray coating, dip coating, bar coating, gravure coating, roll coating, ink jet, spin coating), and then removing the solvent by drying, heating, etc. After application of the coating agent, heating is preferably performed. The drying or heating temperature is, for example, 30° C. or higher and 150° C. or lower, and preferably 30° C. or higher and 80° C. or lower.

For example, a film can be formed by applying the coating agent of the present disclosure to a base material, followed by drying in a dryer at 80° C.

Item 1.

An electret material comprising a fluoropolymer, wherein the fluoropolymer comprises, as a main component, a monomer unit represented by formula (1)

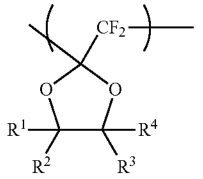

(1)

wherein $R^1$ to $R^4$ are each independently a fluorine atom, fluoroalkyl group, or a fluoroalkoxy group; and the fluoropolymer has a mass average molecular weight of 1 million or more and 5 million or less, or 5000 or more and less than 20000.

Item 2.

The electret material according to Item 1, wherein the fluoropolymer further comprises a fluoroolefin unit.

Item 3.

The electret material according to Item 2, wherein the fluoroolefin unit is at least one member selected from the group consisting of a fluorine-containing perhaloolefin unit, a vinylidene fluoride unit, a trifluoroethylene unit, a pentafluoropropylene unit, and a 1,1,1,2-tetrafluoro-2-propylene unit.

Item 4.

The electret material according to Item 3, wherein the fluorine-containing perhaloolefin unit is at least one member selected from the group consisting of a chlorotrifluoroethylene unit, a tetrafluoroethylene unit, a hexafluoropropylene unit, a perfluoro(methyl vinyl ether) unit, a perfluoro(ethyl vinyl ether) unit, a perfluoro(propyl vinyl ether) unit, a perfluoro(butyl vinyl ether) unit, and a perfluoro(2,2-dimethyl-1,3-dioxol) unit.

Item 5.

The electret material according to Item 2, wherein the fluoroolefin unit is at least one member selected from the group consisting of a chlorotrifluoroethylene unit, a tetrafluoroethylene unit, a hexafluoropropylene unit, a perfluoro(methyl vinyl ether) unit, and a perfluoro(propyl vinyl ether) unit.

Item 6.

The electret material according to any one of Items 1 to 5, which has an average thickness of 0.1 μm or more.

Item 7.

The electret material according to any one of Items 1 to 6, wherein the fluoropolymer has a mass average molecular weight of 1 million or more and 5 million or less.

Item 8.

The electret material according to any one of Items 1 to 7, which has an indentation hardness of 450 $N/mm^2$ or more and 1000 $N/mm^2$ or less.

Item 9.

The electret material according to any one of Items 1 to 8, which has an indentation elastic modulus of 3.5 GPa or more and 10 GPa or less.

Item 10.

The electret material according to any one of Items 1 to 6, wherein the fluoropolymer has a mass average molecular weight of 5000 or more and less than 20000.

Item 11.

The electret material according to any one of Items 1 to 6 and 10, which has an end content of 150 or more.

Item 12.

An electrostatic induction conversion element comprising the electret material according to any one of Items 1 to 11.

Item 13.

The electrostatic induction conversion element according to Item 12, comprising the electret material according to any one of Items 7 to 9.

Item 14.

The electrostatic induction conversion element according to Item 12, comprising the electret material according to Item 10 or 11.

Item 15.

A coating agent for forming the electret material according to any one of Items 1 to 11, the coating agent comprising a fluoropolymer and an aprotic solvent, wherein the fluoropolymer comprises, as a main component, a monomer unit represented by formula (1):

(1)

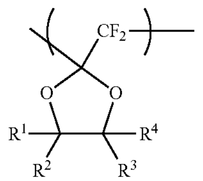

wherein $R^1$ to $R^4$ are each independently a fluorine atom, a fluoroalkyl group, or a fluoroalkoxy group.

Item 16

The coating agent according to Item 15, wherein the content of the fluoropolymer is 20 mass % or more and 65 mass % or less based on the total mass of the coating agent.

Item 17

The coating agent according to Item 15 or 16, wherein the aprotic solvent is at least one solvent selected from the group consisting of perfluoroaromatic compounds, perfluorotrialkylamines, perfluoroalkanes, hydrofluorocarbons, perfluorocyclic ethers, hydrofluoroethers, and olefin compounds containing at least one chlorine atom.

Item 18.

The coating agent according to any one of Items 15 to 17, wherein the aprotic solvent is at least one hydrofluoroether.

Although embodiments are described above, it can be understood that various modifications in form and details may be made without departing from the spirit and scope of the claims.

EXAMPLES

An embodiment of the present disclosure is described in more detail below with Examples; however, the present disclosure is not limited to these.

The symbols and abbreviations in the Examples are used with the following meanings.

Initiator solution (1): a methanol solution containing 50 mass % di-n-propyl peroxydicarbonate (10-hour half-life temperature: 40° C.)

Fluoropolymer (1-11): a polymer composed of unit (1-11)

Mw: mass average molecular weight

Film thickness: average film thickness

GPC Analysis Method (Measurement of Mass Average Molecular Weight of Fluoropolymer)

Sample Preparation Method

A polymer was dissolved in perfluorobenzene to prepare a 2 mass % polymer solution, and the polymer solution was passed through a membrane filter (0.22 μm) to obtain a sample solution.

Measurement Method

Standard sample for measurement of molecular weight: polymethyl methacrylate

Detection method: RI (differential refractometer)

Confirmation of Polymer Solubility

Whether the polymer was dissolved in the liquid was determined as follows.

Each of the prepared liquids was visually observed, and when no undissolved polymer was observed and the entire liquid flowed uniformly at room temperature, it was determined that the polymer was dissolved.

Average Film Thickness

The average film thickness was defined as the average value of a thickness measured 5 times with a micrometer. When measuring the thickness of a film itself was difficult, such as when a film formed on a base material of a substrate etc. could not be peeled off, the average film thickness was calculated by measuring the thickness of the base material before film formation and the thickness of the base material after film formation (the sum of the film thickness and the base material thickness) 5 times each with a micrometer, and subtracting the average value of the thickness before film formation from the average value of the thickness after film formation.

Indentation Hardness and Indentation Elastic Modulus

The indentation hardness ($H_{IT}$; indentation hardness) of the sample was measured using an ENT-2100 ultra-fine hardness tester produced by Nanotec Corporation. The indentation elastic modulus was also measured at the same time. The test was performed by adjusting the indentation depth to be 1/10 or less of the thickness.

Corona Discharge Treatment (Charge Treatment)

Using the device shown in FIG. 1, potential was injected into an electret material by arc discharge. A copper plate 4 comprising a fluoropolymer 1 produced in the Examples or Comparative Example was connected to the ground to form an earth electrode, and a voltage was applied to a needle-shaped electrode 3 with a high-voltage DC power supply device 2 to inject potential into the fluoropolymer 1. Specifically, a corona discharge was generated under the conditions of a voltage of −10 kV, a discharge distance of 30 nm, and a voltage application time of 10 seconds, air molecules were ionized, and the generated air ions were repelled by the polarity of the needle-shaped electrode 3 to apply a DC electric field to the fluoropolymer 1 to inject potential, thereby charging the fluoropolymer as a whole. During the charge treatment, the entire system was placed in an electric furnace, and the surface temperature of the fluoropolymer 1 was maintained at 130° C. or higher.

Surface Potential Measurement

The surface potential of the fluoropolymer was measured with a surface electrometer (Model 347, produced by Trek Japan).

Bending Test

A film (long side: 50 mm, short side: 15 mm, thickness: 0.1 mm) of the fluoropolymer was attached along the outer circumference of a disk (made of SUS) having a diameter of 120 mm and a thickness of 20 mm, and held for 60 seconds. Then, the appearance was visually evaluated. Polymers with no fractures or cracks were evaluated as A, polymers with cracks were evaluated as B, and polymers with fractures were evaluated as C. Fractures indicate that the strength of the polymer is low, and cracks indicate that the strength of the polymer is not so low as to break, but is not high enough.

Adhesion Test (Cross-Cut Test)

Evaluation was performed according to the cross-cut cellophane tape peeling test of JIS K5600. Cross-cut notches at 1-mm intervals were made with a utility knife from the upper part of the produced laminate on the fluoropolymer layer side, and cellophane tape was attached and then peeled off. No peeling was given 10 points, 8 points for 0% or more and less than 5%, 6 points for 5% or more and less than 15%, 4 points for 15% or more and less than 35%, 2 points for 35% or more and less than 65%, and 0 points for 65% or more.

End Content

The end content was determined as a relative value of the number of carbonate end groups per $1\times10^6$ carbon atoms in the monomer unit forming the fluoropolymer backbone. Specifically, this was expressed as a value relative to the number of carbonate end groups in the fluoropolymer of Reference Preparation Example 1, described later, which was taken as 100. The number of carbonate end groups was determined as follows.

A film with a thickness of 0.05 mm or more and 0.2 mm or less is formed from a cut piece of a cast film or press-molded film of the fluoropolymer. The absorbance of the peak at 1809 $cm^{-1}$ attributed to the carbonyl group of the carbonate group (—OC(═O)O—) is measured by infrared absorption spectrum analysis of the film. The number (N) of carbonate groups per $10^6$ backbone carbon atoms is calculated according to the following equation.

$$N=500AW/\varepsilon df$$

A: Absorbance of the peak at 1809 $cm^{-1}$ derived from the carbonate group (—OC(═O)O—)

ε: Molar absorbance coefficient of the peak at 1809 cm derived from the carbonate group (—OC(═O)O—) $1\cdot cm^{-1}\cdot mol^{-1}$). From the model compound, ε=170.

W: Composition average monomer molecular weight calculated from monomer composition d: Film density ($g/cm^3$)

f: Film thickness (mm)

The infrared absorption spectrum analysis was performed using a Perkin-Elmer 1760x FTIR spectrometer (produced by Perkin-Elmer) with 40 scans. The baseline of the IR spectrum obtained was automatically determined by using Perkin-Elmer Spectrum for Windows, Ver. 1.4C, and the absorbance A of the peak at 1809 $cm^{-1}$ was measured. Further, the thickness of the film was measured with a micrometer.

The strength value of the carbonate end of the polymer of Reference Preparation Example 1 obtained in this manner was taken as 100, and the strength value of the carbonate end of the other polymers relative to this value was used as the end content of each polymer.

Preparation Example 1: Polymerization of High-Molecular-Weight Fluoropolymer Comprising Unit (1-11) as Main Component and Production of Polymer Solution (Polymerization Reaction Mixture)

The monomer (M1-11) (10 g), perfluorotripropylamine (15 g) as a solvent, and the initiator solution (1) (4.87 mg) were placed in a 50-mL glass container, and a polymerization reaction was then performed for 20 hours while the mixture was heated such that the internal temperature was 40° C., thereby producing a fluoropolymer (1-11) (6.9 g; Mw: 1125000). The fluoropolymer in the polymerization reaction mixture was dissolved, and the concentration was 31 mass %.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Preparation Example 2

Perfluorotripropylamine was further added to the polymerization reaction mixture obtained in Preparation Example 1 to prepare a solution having a fluoropolymer concentration of 20 mass %.

Preparation Example 3: Polymerization of Low-Molecular-Weight Fluoropolymer Comprising Unit (1-11) as Main Component and Production of Polymer Solution (Polymerization Reaction Mixture)

The monomer (M1-11) (3 g), methyl nonafluorobutyl ether (6 g) as a solvent, and the initiator solution (1) (0.03 q) were placed in a 50-mL glass container, and a polymerization reaction was then performed for 20 hours while the mixture was heated such that the internal temperature was maintained at 40° C., thereby producing a fluoropolymer (1-11) (2.6 g; Mw: 19500). The fluoropolymer in the polymerization reaction mixture was dissolved, and the concentration was 46 mass %.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Preparation Example 4

Methyl nonafluorobutyl ether was further added to the polymerization reaction mixture obtained in Preparation Example 2 to prepare a solution having a fluoropolymer concentration of 30 mass %.

Reference Preparation Example 1: Polymerization of Fluoropolymer Having Molecular Weight of about 98000 (Medium Molecular Weight) Comprising Unit (1-11) as Main Component and Production of Polymer Solution (Polymerization Reaction Mixture)

The monomer (M1-11) (10 g), ethyl nonafluorobutyl ether (20 g) as a solvent, and the initiator solution (1) (0.041 g) were placed in a 50-ml, glass container, and a polymerization reaction was then performed for 20 hours while the mixture was heated such that the internal temperature was maintained at 40° C., thereby producing a fluoropolymer (1-11) (9.0 g; Mw: 97533). The fluoropolymer in the polymerization reaction mixture was dissolved, and the concentration was 31 mass %.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Comparative Preparation Example 1

The polymerization reaction mixture obtained in Preparation Example 1 was added dropwise to toluene to precipitate the polymer, followed by heat treatment at 120° C. for 12 hours, thereby obtaining a medium-molecular-weight fluoropolymer (1-11) (1 g). The obtained fluoropolymer (1-11) was pressed with a heat press under heating conditions of 270° C. to obtain a film having an average film thickness of 50 μm.

Example 1: Electret Material of High-Molecular-Weight Fluoropolymer

The polymerization reaction mixture prepared in Preparation Example 2 was directly used as a coating agent, and an electret material was produced in the following manner.

The coating agent was applied to a copper plate (thickness: 0.5 mm×length: 30 mm×width: 15 mm) by bar coating such that the thickness after drying was 20 μm. The copper plate used was treated beforehand with γ-aminopropyltriethoxysilane. After coating, air drying was performed, followed by drying with a blower dryer at 80° C. for 4 hours, thereby obtaining a laminate in which a fluoropolymer layer (electret material; length: 30 mm×width: 15 mm) was formed on the copper plate. The fluoropolymer layer had a thickness of 21 μm, and was a uniform coating film with no unevenness in thickness.

The indentation hardness and indentation elastic modulus of the surface of the laminate on the fluoropolymer side were measured with a nanoindenter.

Next, the laminate was set in the device shown in FIG. 1, and corona discharge treatment was performed to inject potential into the fluoropolymer layer to charge it, thereby producing an electret. The surface potential of the produced electret was measured.

Then, the laminate was subjected to heat treatment. The heat treatment was performed by holding the laminate in a blower dryer at 100° C. for 1000 hours. After the laminate was taken out from the dryer and cooled to room temperature, the surface potential of the electret was measured again. The measured surface potential value (initial surface potential) of the electret before heat treatment was taken as 100, and the measured surface potential value after heat treatment (surface potential after heat treatment) relative to the initial surface potential was calculated as the potential retention rate (%). No peeling of the film from the copper plate was visually confirmed.

Separately, a glass substrate was coated with the same coating agent such that the thickness after drying was 100 μm, and dried at 80° C. for 4 hours to form a transparent film. Then, the film was removed from the glass plate to obtain a film of the fluoropolymer (1-11) having an average film thickness of 100 μm. This film was used to perform a bending test.

The above results are shown in Table 1. The electret material produced using the coating agent of Preparation Example 2 had a high molecular weight, high hardness (indentation hardness and indentation elastic modulus), no fractures or cracks in the bending test, and a high potential retention rate. These results confirmed that this electret material had high hardness, a high potential retention rate, low peel properties due to no peeling from the base material, and high rigidity due to no fractures or cracks.

Example 2: Electret Material of Low-Molecular-Weight Fluoropolymer

The production of an electret material, various measurements, and the like were performed in the same manner as in Example 1, except that the polymerization reaction mixture of Preparation Example 4 was directly used as a coating agent in place of the polymerization reaction mixture of Preparation Example 2, the film thickness was 30 μm, the end content was measured in place of the measurements of indentation hardness and indentation elastic modulus, and a cross-cut test was performed in place of the bending test. The results are shown in Table 1. No peeling of the film from the copper plate was visually confirmed.

The electret material produced using the coating agent of Preparation Example 4 had a low molecular weight, a high potential retention rate, a high end content, and a high adhesion in the cross-cut test. These results confirmed that this electret material had a high potential retention rate and excellent adhesion to the base material due to no peeling from the base material. Further, the excellent adhesion of the electret material was considered to also contribute to the effect of improving the adhesion to the base material due to the end.

Reference Example 1: Electret Material of Fluoropolymer Having Molecular Weight of About 98000

The production of an electret material, various measurements, and the like were performed in the same manner as in Example 1, except that the polymerization reaction mixture of Reference Preparation Example 1 was directly used as a coating agent in place of the polymerization reaction mixture of Preparation Example 2, the film thickness was 25 μm, the end content was measured, and a cross-cut test was performed. The results are shown in Table 1.

In the electret material produced using the coating agent of Reference Preparation Example 1, fractures and cracks were both observed in the bending test, the potential retention rate was slightly lower than that of the electret materials of Examples 1 and 2, the indentation hardness and indentation elastic modulus were lower than those of the electret of Example 1, and the adhesion was low in the cross-cut test. It was considered that because the molecular weight of the fluoropolymer forming the electret material was lower than the molecular weight of the fluoropolymer forming the electret material of Example 1, the electret material had low rigidity, low hardness, and a low elastic modulus, and showed fractures and cracks. It was considered that because the molecular weight of the fluoropolymer forming the electret material was higher than the molecular weight of the fluoropolymer forming the electret material of Example 2, the adhesion to the base material was insufficient, which caused peeling.

It was confirmed from the above results that fluoropolymers having the same monomer unit did not have the same suitability as electret materials depending on their molecular weight. It was confirmed that the more appropriate molecular weight of the fluoropolymer (1) used in the electret material was less than 20000 or 1 million or more.

Comparative Example 1: Electret Material of Heat Press-Molded Fluoropolymer

The polymer film produced in Comparative Preparation Example 1 was placed on the same copper plate as used in Example 1, and bonded to the copper plate with a heat press under heating conditions of 200° C. Then, corona discharge treatment was performed in the same manner as in Example 1; however, the film was peeled off from the copper plate during the treatment. Accordingly, the treatment was stopped, and no potential could be injected into the fluoropolymer film.

The fluoropolymer film produced from a solution in which a solid fluoropolymer was dissolved was difficult to use as an electret material.

TABLE 1

| Coating agent | Example 1 Preparation Example 2 | Example 2 Preparation Example 4 | Comparative Example 1 Reference Preparation Example 1 |
|---|---|---|---|
| Polymer molecular weight | 1125000 | 19500 | 97533 |
| Film thickness (μm) | 21 | 30 | 25 |
| Indentation hardness ($N/mm^2$) | 480 | — | 380 |
| Indentation elastic modulus (GPa) | 4.1 | — | 2.6 |
| Initial surface potential (V) | 1024 | 1002 | 971 |
| Potential retention rate (%) | 90 | 88 | 85 |
| Bending test | A | — | C |
| Cross-cut test | — | 10 | 6 |
| End content | — | 475 | 100 |

REFERENCE SIGNS LIST

1. Electret material (fluoropolymer)
2. High-voltage DC power supply
3. Needle-shaped electrode
4. Earth electrode (copper plate)

The invention claimed is:

1. An electret material comprising a fluoropolymer, wherein the fluoropolymer comprises, as a main component, a monomer unit represented by formula (1):

(1)

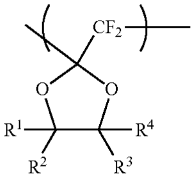

wherein $R^1$ to $R^4$ are each independently a fluorine atom, a fluoroalkyl group, or a fluoroalkoxy group;

the fluoropolymer has a mass average molecular weight of 1 million or more and 5 million or less, or 5000 or more and less than 20000, the electret material has an average thickness of 0.1 μm or more, and the fluoropolymer has carbonate end.

2. The electret material according to claim 1, wherein the fluoropolymer further comprises a fluoroolefin unit.

3. The electret material according to claim 2, wherein the fluoroolefin unit is at least one member selected from the group consisting of a fluorine-containing perhaloolefin unit, a vinylidene fluoride unit, a trifluoroethylene unit, a pentafluoropropylene unit, and a 1,1,1,2-tetrafluoro-2-propylene unit.

4. The electret material according to claim 3, wherein the fluorine-containing perhaloolefin unit is at least one member selected from the group consisting of a chlorotrifluoroethylene unit, a tetrafluoroethylene unit, a hexafluoropropylene unit, a perfluoro(methyl vinyl ether) unit, a perfluoro(ethyl vinyl ether) unit, a perfluoro(propyl vinyl ether) unit, a perfluoro(butyl vinyl ether) unit, and a perfluoro(2,2-dimethyl-1,3-dioxol) unit.

5. The electret material according to claim 2, wherein the fluoroolefin unit is at least one member selected from the group consisting of a chlorotrifluoroethylene unit, a tetrafluoroethylene unit, a hexafluoropropylene unit, a perfluoro(methyl vinyl ether) unit, and a perfluoro(propyl vinyl ether) unit.

6. The electret material according to claim 1, wherein the fluoropolymer has a mass average molecular weight of 1 million or more and 5 million or less.

7. The electret material according to claim 1, which has an indentation hardness of 450 $N/mm^2$ or more and 1000 $N/mm^2$ or less.

8. The electret material according to claim 1, which has an indentation elastic modulus of 3.5 GPa or more and 10 GPa or less.

9. The electret material according to claim 1, wherein the fluoropolymer has a mass average molecular weight of 5000 or more and less than 20000.

10. An electrostatic induction conversion element comprising the electret material according to claim 1.

11. The electrostatic induction conversion element according to claim 10, wherein the fluoropolymer has a mass average molecular weight of 1 million or more and 5 million or less.

12. The electrostatic induction conversion element according to claim 10, wherein the fluoropolymer has a mass average molecular weight of 5000 or more and less than 20000.

13. A coating agent for forming the electret material according to claim 1, the coating agent comprising a fluoropolymer and an aprotic solvent, wherein the fluoropolymer comprises, as a main component, a monomer unit represented by formula (1):

(1)

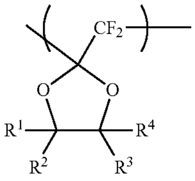

wherein $R^1$ to $R^4$ are each independently a fluorine atom, a fluoroalkyl group, or a fluoroalkoxy group.

14. The coating agent according to claim 13, wherein a content of the fluoropolymer is 20 mass % or more and 65 mass % or less based on a total mass of the coating agent.

15. The coating agent according to claim 13, wherein the aprotic solvent is at least one solvent selected from the group consisting of perfluoroaromatic compounds, perfluorotrialkylamines, perfluoroalkanes, hydrofluorocarbons, perfluorocyclic ethers, hydrofluoroethers, and olefin compounds containing at least one chlorine atom.

16. The coating agent according to claim 13, wherein the aprotic solvent is at least one hydrofluoroether.

* * * * *